June 7, 1927.

C. E. AYERS 1,631,354

BLOW-OUT PATCH FOR BALLOON TIRES

Filed Aug. 9, 1926

Inventor
Charles E. Ayers,
By Murray and Gugelter
Attorneys.

Patented June 7, 1927.

1,631,354

UNITED STATES PATENT OFFICE.

CHARLES E. AYERS, OF CLEVES, OHIO.

BLOW-OUT PATCH FOR BALLOON TIRES.

Application filed August 9, 1926. Serial No. 128,081.

This invention relates to blow-out patches or boots for use with balloon type tires and has for an object the provision of such patch which will effectively remain in position in a low pressure tire.

Another object is to provide such patch or boot for the purpose stated, that may be self vulcanizing to a tire during use.

These and other objects are attained by the means described herein and disclosed in the accompanying drawings in which.

Figure 1:
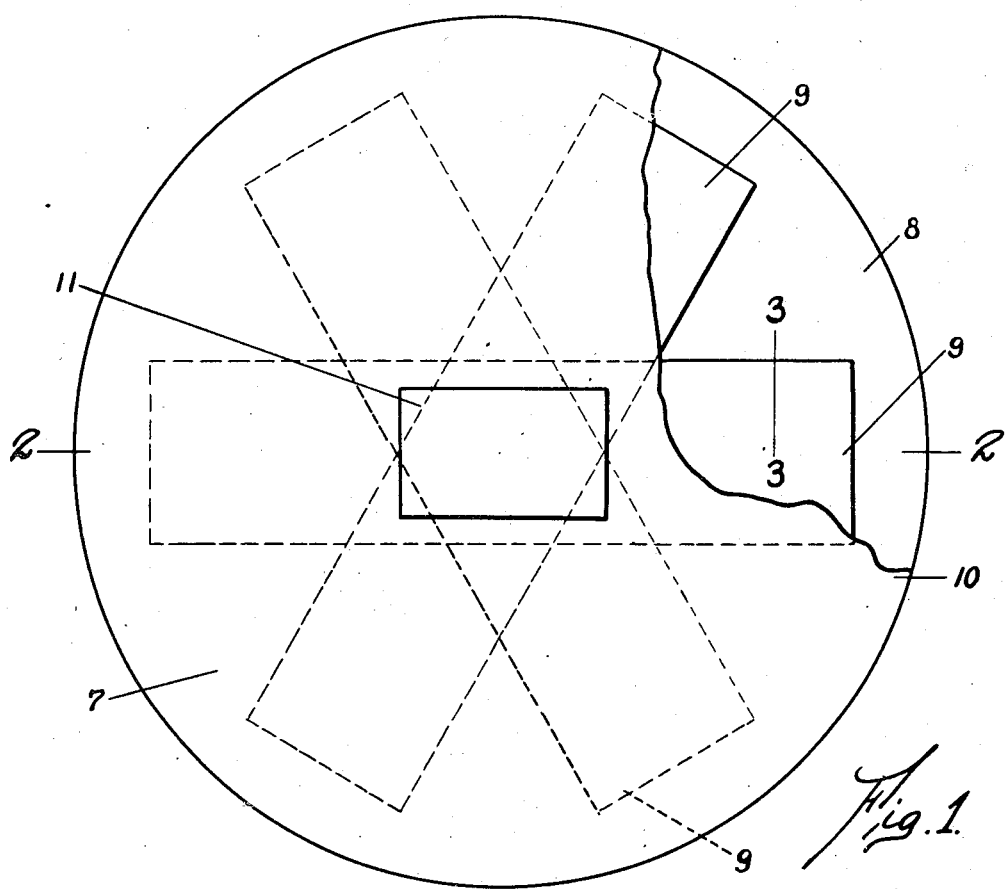
Fig. 1 is a top plan view of a patch of my invention, part being broken away.
Figure 2:
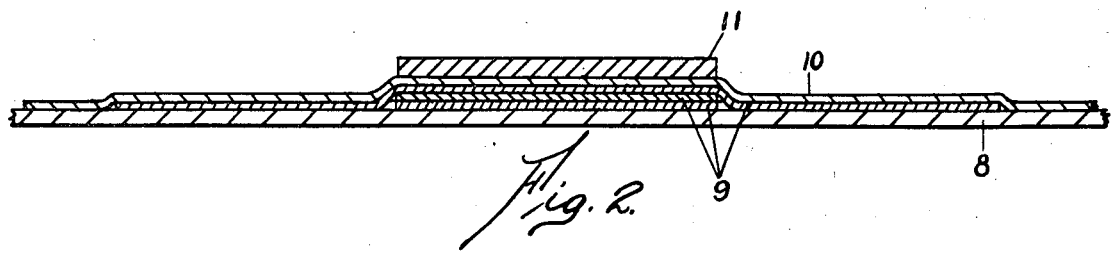
Fig. 2 is a cross-sectional view on line 2—2 of Fig. 1.
Figure 3:
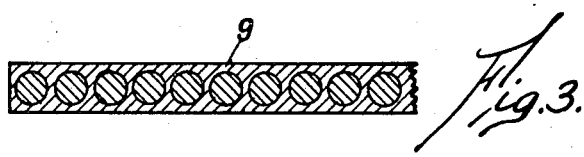
Fig. 3 is an enlarged cross-sectional view on line 3—3 of Fig. 1.

The patch or boot 7 of my invention comprises a built up structure designed to provide for the broken or blown out portion of a low pressure tire a wall structure having the same flexibility and smooth traction as the wall of the casing itself. The base 8 is of pure flexible rubber stock such as is used for inner tubes, and such base may be cut from discarded tubes. It may take practically any desired shape, however, a circular or round base is found very effective. Strips of uncured cord stock 9 such as is used in building tires are then cut to lengths less than the diameter of the base and are laid across one another at various angles to provide a sufficient number of plies of cord stock. Three strips are shown herein and provide a sufficient thickness for most purposes, although a greater number of plies may be used if desired. Next there is applied a sheet of so-called raw cushion stock 10, which covers the strips and the top face of the base, so that the parts remain in the proper position. Partial vulcanizing of these parts provides a strong blow-out patch. Upon the top of the cushion stock 10 and directly above the overlapping section of cord stock 9 is placed a section of uncured tread stock 11. A thin coating of binding cement, (not shown) may be added if desired. Patches or boots of the type herein described are generally for emergency use, or in fixing up tires which appear to have but little remaining mileage. Not infrequently such emergency boots or patches are inserted in a casing without proper cleansing of the surface of said casing, and in such cases the binding cement is useful. The proper application and operation of the blow-out patch of my invention is as follows:

A low pressure tire having a burst or blown out section is carefully scoured or cleansed on the inner wall adjacent the break and the patch is positioned over the cleansed portion, with the section of thread stock directly over the break. A tube is then inserted in the tire, and inflated and the tire is put into use. The patch being flexible in all directions does not offer a rigid shoulder to the roadway as the patch portion strikes the road so that there is no danger of the edge of the patch causing bumpy traction of the tire or causing the tread of the tire to be worn away adjacent the boundary of the patch. The component parts of the patch being in a semi raw or partially cured state, the heat due to the friction of the tire on the roadway will advance the curing of the stock and this together with the pressure of the machine upon which the tire is placed provides effective self vulcanization of the patch to the casing. It will be apparent that there is provided the individual fibers of cord stock running in various directions over the weakened portion of the casing and that the tread stock is forced into the breach in the tread and becomes practically vulcanized in place.

By test it has been found that blown out low pressure tires provided with patches of my invention will usually give a mileage of approximately one-thousand miles more than those provided with ordinary stiff boots. The reason for this has been touched upon above; namely, that the stiff edges of the normal boot or blow-out patch present a cutting edge against which the body of the casing is flexed at each revolution of the wheel and this action is destructive to the casing adjacent the boot or patch.

What I claim is:

1. A boot for low pressure tires comprising a flexible rubber base, narrow strips of cord stock overlapping one another over the center of the base, means for securing the strips of cord stock in position upon the base and a section of tread stock mounted above the overlapping portion of the strips.

2. A tire patch comprising a rubber base, strips of uncured cord stock overlapping one another at different angles, a sheet of cushion stock superposed upon the base and strips and a piece of raw tread stock surmounting the patch above the overlapped portion of the strips.

3. A patch of the class described comprising a flexible rubber base, cord stock in overlapping strips, a piece of tread stock disposed upon the overlapping portion of the cord stock strips, and adhesive means serving to retain the parts in position and for causing them to adhere to a tire casing.

4. A patch for the breach in a tire casing comprising a piece of tread stock for entry into the breach from the inside of the tire, a piece of semi cured cushion stock adapted to adhere to the casing wall about the tread stock, and a plurality of strips of cord stock disposed under the cushion stock and overlapping one another beneath the piece of tread stock and retained in position against the cushion stock by a flexible rubber base member.

5. A flexible blow-out patch, consisting of a rubber base, cord stock arranged to provide a number of plies at the center of the base and single plies toward the edges of said base, a piece of raw tread stock disposed above the multiple ply section of the patch and means retaining the parts in position and serving to effect vulcanization of the parts to one another and to a tire casing under heat and pressure generated by the tire in use.

6. As a new article of manufacture, a flexible blow-out patch for low pressure tires comprising a rubber base, raw cord stock, and tread stock, the parts being so positioned that the cord stock presents a single ply at the edges of the base and a plurality of plies beneath the tread stock.

7. As a new article of manufacture a flexible blow-out patch for low pressure pneumatic tires comprising a flexible rubber base, raw cord stock arranged in layers with the cords of the several layers extending in different directions and uncured tread stock, the parts being so positioned as to permit uniform free flexing of the patch in all directions about the tread stock.

In testimony whereof, I have hereunto subscribed my name this 19th day of July, 1926.

CHARLES E. AYERS.